(12) United States Patent
Chou et al.

(10) Patent No.: US 8,422,421 B2
(45) Date of Patent: Apr. 16, 2013

(54) AUTOMATIC CANCELLATION OF BP MERGER IN MULTI-BAND OFDM ALLIANCE (MBOA) ULTRA WIDE BAND (UWB) SYSTEMS

(75) Inventors: Chun-Ting Chou, Taipei (TW); Javier del Prado Pavon, Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 868 days.

(21) Appl. No.: 11/916,234

(22) PCT Filed: May 31, 2006

(86) PCT No.: PCT/IB2006/051746
§ 371 (c)(1), (2), (4) Date: Aug. 4, 2010

(87) PCT Pub. No.: WO2006/129286
PCT Pub. Date: Dec. 7, 2006

(65) Prior Publication Data
US 2010/0290387 A1    Nov. 18, 2010

Related U.S. Application Data

(60) Provisional application No. 60/685,931, filed on May 31, 2005.

(51) Int. Cl.
    *H04J 3/14*    (2006.01)
(52) U.S. Cl.
    USPC .......................................................... 370/328

(58) Field of Classification Search .......................... None
See application file for complete search history.

(56) References Cited

U.S. PATENT DOCUMENTS

| | | | |
|---|---|---|---|
| 2003/0078062 A1 | 4/2003 | Burr | |
| 2004/0152464 A1 | 8/2004 | Sugaya | |
| 2005/0063419 A1 | 3/2005 | Schrader | |
| 2006/0040701 A1* | 2/2006 | Long et al. | ................... 455/525 |

FOREIGN PATENT DOCUMENTS

| WO | 03077064 | 9/2003 |
|---|---|---|
| WO | 2005064853 | 7/2005 |
| WO | 2005076533 | 8/2005 |
| WO | 2005076543 | 8/2005 |

OTHER PUBLICATIONS

Chun-Ting Chou et al: "Mobility Support Enhancements for the WiMedia UWB MAC Protocol" Broadband Networks, 2005 2nd Intnl Conf. on Boston, MA Oct. 3-7, 2005.
Anonymous: "Standard ECMA—368 High Rate Ultra Wideband PHY and MAC Standard" Dec. 2005.

* cited by examiner

*Primary Examiner* — Kevin C Harper
*Assistant Examiner* — Rhonda Murphy

(57) ABSTRACT

The current MBOA UWB MAC protocol requires a device that detects alien devices to include a BP Switch IE in its beacon so that its neighbors may learn the presence of the alien devices and follow that device to relocate their beacons in a coordinated fashion. However, during the transition period of beacon relocation, that device may decide to halt the relocation process as required by the standard and such decisions also have to be received by its neighbors. In such a case, a BP switch IE will be generated by that device which includes a BPST offset equal to a length of a superframe.

6 Claims, 6 Drawing Sheets

| MAC HEADER 401 | BEACON PARAMETERS 402 | INFORMATION ELEMENT 403 | INFORMATION ELEMENT 404 | FRAME CHECK SEQUENCE 405 |

FIG. 4

| ELEMENT ID FIELD | LENGTH FIELD | BP MOVE COUNTDOWN FIELD | BEACON SLOT OFFSET FIELD | BPST OFFSET FIELD |
|---|---|---|---|---|
| 501 | 502 | 503 | 504 | 505 |

AUTOMATIC CANCELLATION OF BP MERGER IN MULTI-BAND OFDM ALLIANCE (MBOA) ULTRA WIDE BAND (UWB) SYSTEMS

CROSS REFERENCE TO RELATED APPLICATION

This application claims the benefit of U.S. provisional application Ser. No. 60/685,931 filed 31 May 2005, which is incorporated herein by reference.

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), as well as audio/visual streaming, video/audio telephony, stationary computers in wireless networks, and portable handsets, to name only a few.

Each wireless network includes a number of layers and sub-layers, such as the Medium Access Control (MAC) sub-layer and the Physical (PHY) layer. The MAC layer is the lower of two sub-layers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

With standards and protocols that provided for significant improvement in the control of voice and data traffic, the need for devices that belong to different networks to synchronize and communicate has increased. The current UWB MAC protocol requires a device that detects alien devices (i.e., devices that belong to a different network) to include a beacon period (BP) switch information element (IE) in its beacon so that its neighbors may learn the presence of the alien network and follow that device to relocate their beacons in a coordinated fashion. In this way, devices in a first network synchronize their Beacon Period Start Times (BPSTs) with the devices of a second network, so each listens for and receives beacons that contain common MAC information. FIG. 1 depicts two alien networks 1 and 2, respectively. If device A in network 1 detects the presence of device D in network 2, it may desire to merge the beacon period of its network 1 with that of network 2. Device A will include a BP switch IE in its beacon and send it to devices B and C in order to convey the intention of merging. Devices B and C, for example, will alter their BPST to synchronize with devices in network 2 according to the BP switch IE from device A. Thus, devices A, B, and C in network 1 have merged their beacon period with that of network 2 and devices in both networks will send beacons in the merged beacon period.

WiMedia Ultra-Wide Band (UWB) MAC 1.0 (published as ECMA standard 368) requires devices with different beacon period start times (BPSTs) to merge together (i.e., to use the same BPST) when they come into the range of each other, so as to maintain clock synchronization. In order to ensure a unanimous merging process, devices with BPSTs in the second half of an alien device's superframe should use the alien device's BPST as their new BPST, and relocate their beacons as shown in FIG. 2. This two-dimensional representation of a beacon period shows that before merging, in superframe depiction 20, devices A, B, and C each have a BPST which occurs in the midst of a superframe as defined by the BPST of devices G, D, G, E, I, and F. However, after merging, as depicted in superframe depiction 21, devices A, B, C, D, E, F, G, H, and I use the same BPST and relocate their beacons so each begins its beacon period at the same time.

However, during the transition of beacon period relocation, devices may decide to halt the relocation process as required by the standard. This can be due to a timeout operation, deterioration in signal strength, or some other type of interference that renders the synchronization of two networks undesirable. Such decisions to refrain from relocation of BPSTs also have to be received by other participating devices in a network. For example, referring again to FIG. 1, device A recognized it to be desirable to merge its BPST with that of network 2; however, it detects that device D is no longer responsive. If device A already transmitted a BP switch IE to the other devices in network 1, it must then somehow alert devices B and C to not alter their BPSTs by explicitly informing the participating neighbors to halt the beacon relocation in a coordinate fashion with minimal implementation overhead.

In order to halt the beacon relocation using the existing coordinated BP merging algorithm from the UWB 1.0 spec, a device has to relocate its beacon to the alien BP indicated by the BP Switch IE with the largest BPST Offset value. The largest possible BPST Offset value based on the current standard is one half of the superframe time as shown in FIG. 2, which is 32768 microseconds.

For a device that decides to halt an in-progress beacon relocation process, it can include a BP Switch IE with BPST Offset value set to 65536 microseconds, which is exactly the time equivalent of one superframe. Since such a value is larger than any possible BPST Offset value found in the BP Switch IE, all other devices that receive the BP Switch IE with BPST Offset=65536 will relocate their beacons to the alien network BP indicated by this BP Switch IE. Fortunately, the alien network BP is exactly the same BP that the devices (i.e., B and C from FIG. 1) are using since the BPSTs are exactly one superframe apart. Therefore, although these devices still "relocate their beacons", such relocation is equivalent to halting the beacon relocation process. This process allows for no additional procedure needs to be taken to halt in-progress beacon relocation.

FIG. 4 depicts Beacon frames; and

FIG. 5 depicts a BP Switch IE format; and

Figure 1:
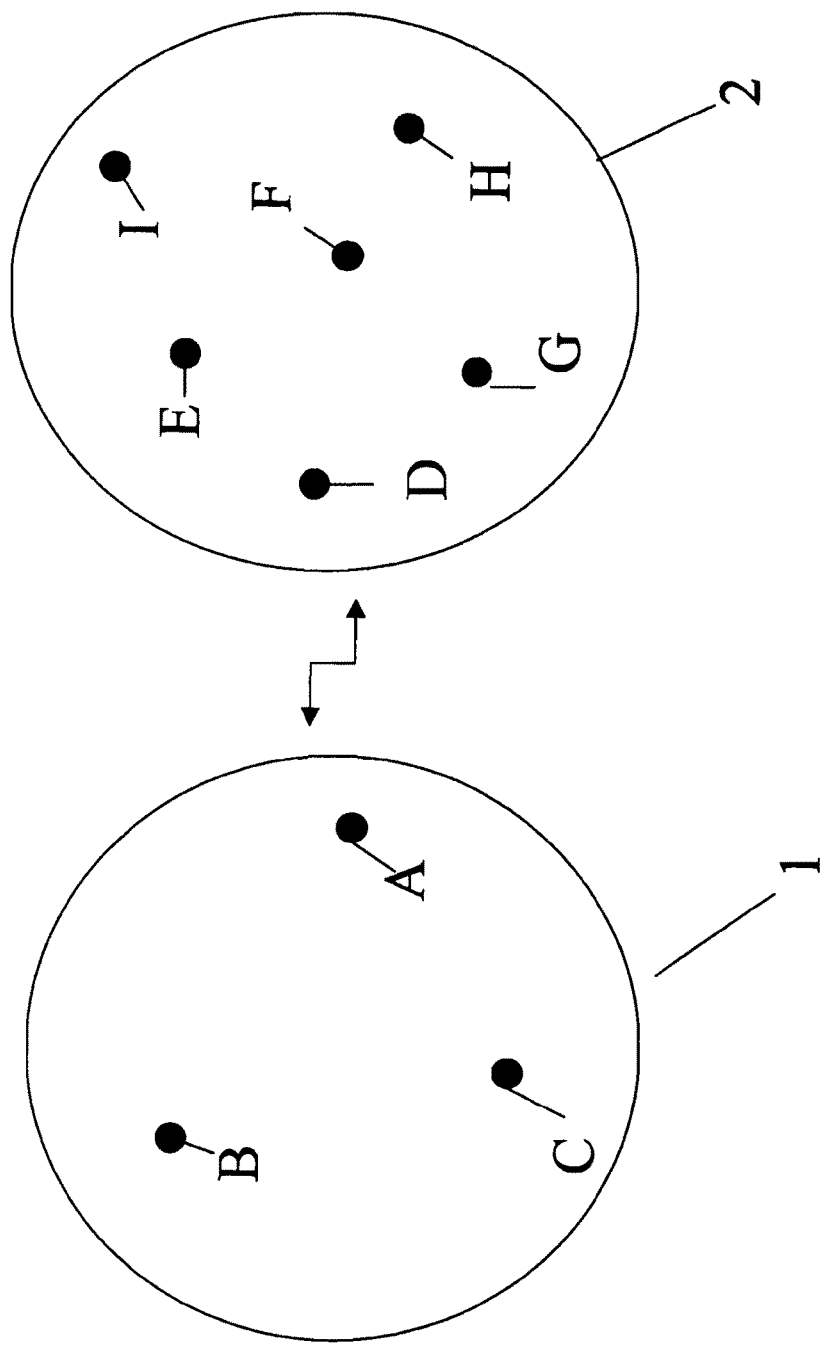
FIG. 1 depicts two wireless networks in which devices communicate.
Figure 2:
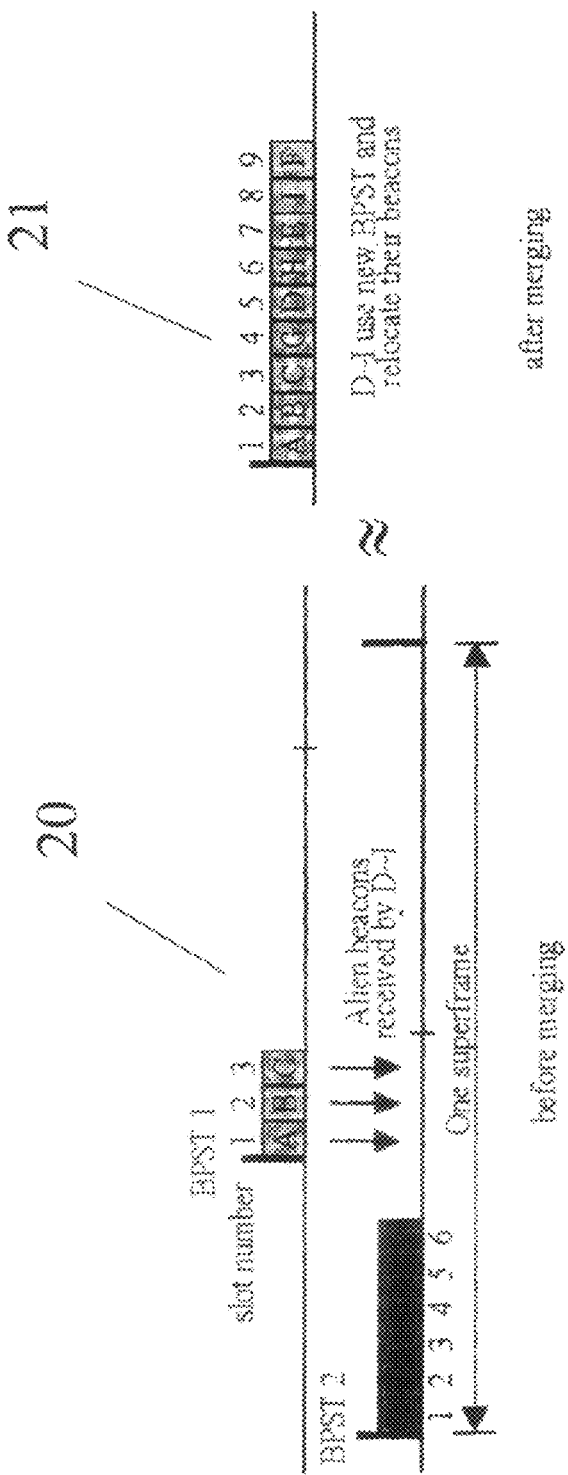
FIG. 2 depicts a superframe before BP merger and a superframe after BP merger.
Figure 3:
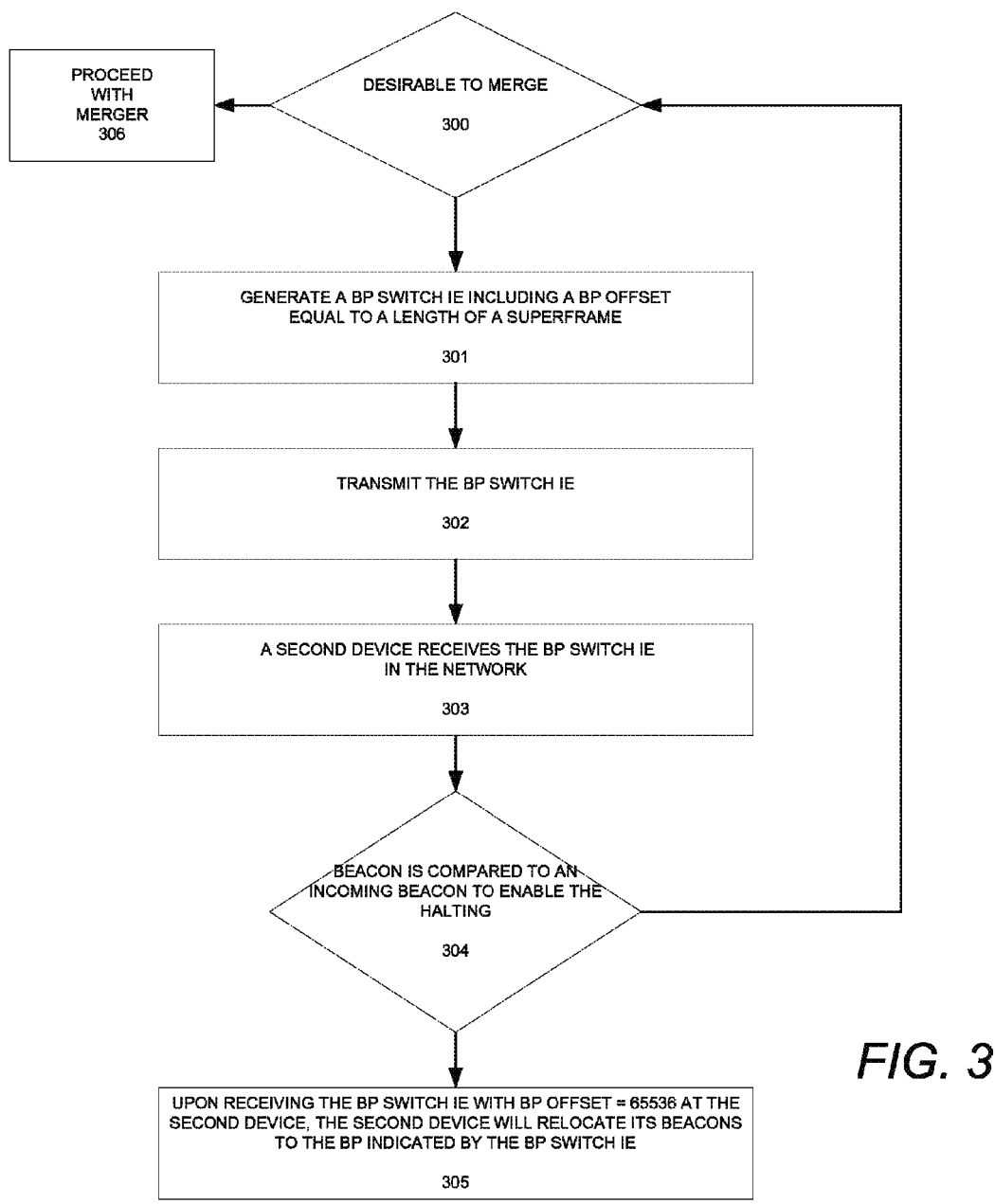
FIG. 3 depicts a flow chart diagram of a method of canceling a BP merger.

FIG. 3 depicts a method of canceling a BP merge. In step 300, the device that detected an alien network and originally forwarded a BP switch IE to the other devices in its network determines whether it is still desirable to merge. If it remains desirable, then the device proceeds with the merger in step 306 as specified in UWB 1.0 spec. If however, the device determines in step 300 that it is no longer desirable to merge BP, the device will proceed to step 301. This decision may be based, for example, on a timeout operation, deterioration in signal strength, or some other type of interference whereby the device no longer receives signal of a certain quality from the alien network. If this occurs, in step 301, the device generates a BP Switch IE that includes a BPST offset equal to a length of a superframe.

The BP switch IE exists within a beacon frame 400 as depicted in FIG. 4. The beacon frame can contain, for example, a MAC header 401, beacon parameters 402, information elements 403-404, and Frame check sequence (FCS) 405. MAC header 401 contains information on medium access control. Beacon parameters 402 contain information on the beacon (i.e., period, frequency, duration). Information elements 403, 404 contain control or management information conveyed during the beacon period. FCS 405 checks if a frame is corrupt. It is composed of error detecting code and detects when a beacon frame is not properly received.

One example of a format IE 403, 404 is a BP switch IE format 500 as depicted in FIG. 5. BP switch IE frame format 500 contains an element ID field 501 which identifies the type of information element. Length field 502 describes the length of the BP Switch IE and how much information it contains. BP move countdown field 503 contains information regarding the timing for a device to move its BP. Beacon slot offset field 504 contains information regarding by how many slots in the new beacon period a device should offset its current beacon slot. BPST offset field 505 contains information regarding a period of time by which a device should offset its BPST.

In order to halt an in-progress beacon relocation process the device generating BP Switch IE in step 301 of FIG. 3 will set BPST Offset field 505 to 65536 and Beacon Slot Offset field 504 to 0 in the BP Switch IE 500. This combination is exactly the time equivalent of one superframe without changes in beacon slots. The device transmits the BP switch IE in its beacon in step 302. In step 303, a second device in the network receives the beacon. In step 304, it compares the value of a BP switch IE in the previous beacon it received with the BP switch IE in the beacon just received in step 303 (e.g., the beacon received during the current superframe). If the BP switch IE received in step 303 is smaller than BP switch IE in the previous beacon it received, the second device will return to step 300.

If the beacon relocation process is intentionally halted by the first device, it will set the BP Offset to 65536 which is a value is larger than any possible BPST Offset value found in the BP Switch IE of the previous beacon. When the second device receives the BP Switch IE with BPST Offset=65536, it will relocate its beacons to the BP indicated by this BP Switch IE in step 305. Fortunately, the BP is exactly the same BP that the devices were using before beacon relocation began since the BPSTs are exactly one superframe apart. Therefore, although the second device still relocates its beacon in step 305, such relocation is equivalent to halting the beacon relocation process. This is a minimum amount of additional procedure necessary for halting an in-progress beacon relocation. Additionally, this method applies regardless of the length of the superframe. For example, a superframe length can be less than one second or less than 200 milliseconds.

Figure 6:
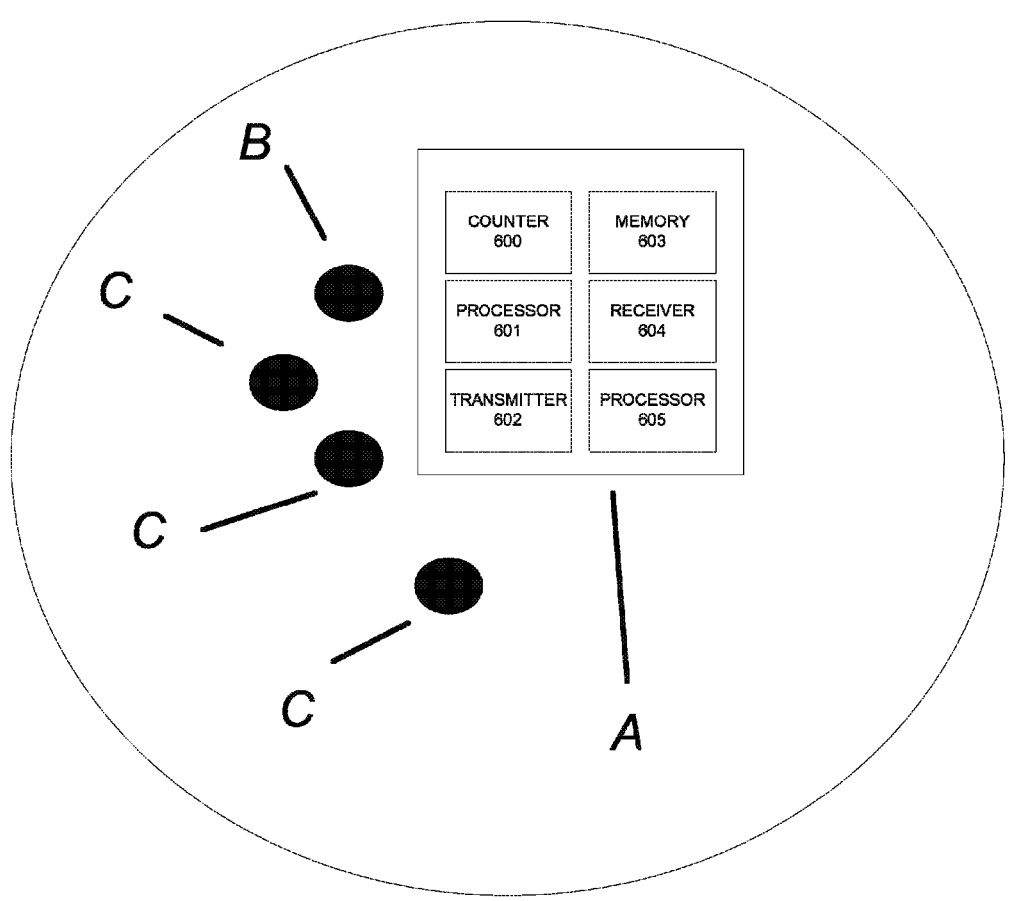
FIG. 6 depicts a wireless network with several devices.

A wireless network for carrying out the method depicted in FIG. 3 appears in FIG. 6. Wireless network 1 contains a device A that decides to halt an in-progress beacon period merge. Device A contains a counter 600. Once Device A detects the presence of a device in an alien network and calls for a beacon period merge, it may again check that the alien network is still available for communication. Counter 600 determines that a beacon period merge is not desirable because device A takes too long to again hear the alien network. Device A also contains a processor 601. Processor 601 determines that an in-progress beacon period merge should be halted based on counter 600. In order to accomplish this, processor 601 generates a beacon containing a Beacon Switch IE with a BSPT offset equal to the superframe length. Device A also contains a transmitter 602 for transmitting the beacon generated by processor 601.

Device A may not be the device within network 1 to recognize the desirability of halting an in-progress beacon period merge. In case a different device in network 1 initiates a halt to an in-progress beacon period merge, device A contains a memory 603 for storing a beacon transmitted in a current superframe. This beacon will be compared (e.g., step 304 of FIG. 3) to an incoming beacon to enable the halting. Device A also contains a receiver 604 for receiving beacons and a processor 605 for reading BP Switch IE in a beacon received in a current superframe; replacing the stored BP Switch IE with an incoming BP Switch IE if the comparison determines the value of the incoming BP Switch IE is larger than the value of the stored BP Switch IE. Processor 601 and 605 may be the same processor or different processors.

In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A method of canceling a beacon period merge comprising:
   determining a beacon period merge is not desirable in at least one first device;
   generating a first BP Switch information element (IE) in said at least one first device comprising a beacon period start time (BPST) offset equal to a length of a superframe, responsive to said determination;
   transmitting a beacon containing said first BP Switch information element (IE) from said at least one first device;
   receiving said beacon in at least one second device;
   comparing a value of said first BP Switch IE in said received beacon to a value of a second BP Switch IE in a beacon transmitted in a current superframe; and
   replacing said second BP Switch IE with said first BP Switch IE if said comparison determines the value of said first BP Switch IE is larger than the value of the second BP Switch IE.

2. The method of claim 1, wherein the length of a superframe is less than one second.

3. The method of claim 1, wherein the length of a superframe is less than 200 milliseconds.

4. A wireless network for communicating a cancellation of a beacon period merge comprising:
   a first transceiver that recognizes a beacon period merge is not desirable;
   wherein said first transceiver transmits a beacon containing a BP Switch information element (IE) comprising a beacon period start time (BPST) offset equal to the length of a superframe, responsive to said first transceiver recognition;
   a second transceiver for receiving the beacon;
   wherein said second transceiver compares a value the received BP Switch information element (IE) in said received beacon to a value of a stored BP Switch information element (IE) from a beacon transmitted in a current superframe and replaces said stored BP Switch information element (IE) with said received BP Switch IE if said comparison determines the value of said received BP Switch information element (IE) is larger than the value of the stored BP Switch information element (IE).

5. The wireless network of claim 4 further comprising a plurality of third transceivers for propagating the beacons.

6. A device for canceling a beacon period merge comprising:
- a counter for determining that a beacon period merge is not desirable;
- a processor for generating a Beacon Switch information element (IE) comprising a beacon period start time (BPST) Offset equal to the superframe length and including the BP Switch IE in a beacon, responsive to said counter determination;
- a transmitter for transmitting the beacon;
- a memory for storing a stored beacon transmitted in a current superframe;
- a receiver for receiving a beacon; and
- a processor for reading a received BP Switch IE in a beacon transmitted in a current superframe, replacing a stored BP Switch IE from said stored beacon with said received BP Switch IE if it determines the value of said received BP Switch to be larger than the value of the stored BP Switch IE.

* * * * *